G. H. BANKS.
CONVERTIBLE INTEREST BEARING SAVINGS CHECK.
APPLICATION FILED JUNE 17, 1918.

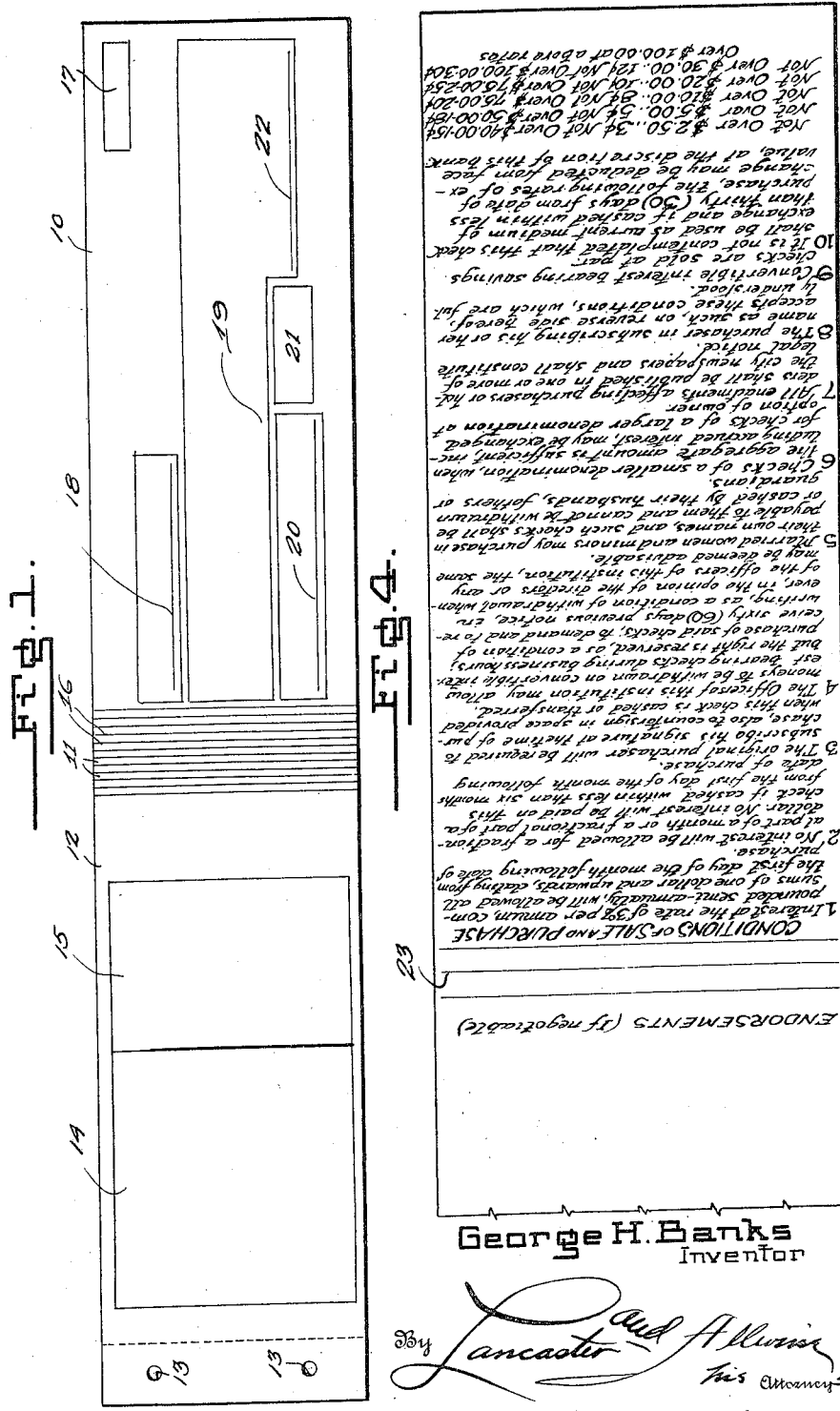

1,380,762.

Patented June 7, 1921.
2 SHEETS—SHEET 2.

George H. Banks
Inventor

UNITED STATES PATENT OFFICE.

GEORGE H. BANKS, OF MEMPHIS, TENNESSEE.

CONVERTIBLE INTEREST-BEARING SAVINGS-CHECK.

1,380,762.     Specification of Letters Patent.     Patented June 7, 1921.

Application filed June 17, 1918. Serial No. 240,461.

*To all whom it may concern:*

Be it known that I, GEORGE H. BANKS, a citizen of the United States, and a resident of Memphis, in the county of Shelby and State of Tennessee, have invented certain new and useful Improvements in Convertible Interest-Bearing Savings-Checks, of which the following is a specification.

The present invention relates to checks, and has particular reference to an improved and simplified check constructed for use by a banking institution for issue to patrons, and has for an object to provide a check which may be used for encouraging thrift and building up savings account, and which also may be employed as a convenient checking method in the conduct of business, by travelers and the like.

Another object of the present invention is to provide a check of simplified construction which embodies a stub portion adapted to be retained by the banking institution and bearing certain data to eliminate many of the features in accounting, and a body part which is adapted to be issued to the patron and which is provided with means for carrying the signature of the patron to whom the check is issued, a portion adapted to receive therein the name of any amount within the limit of that for which the check is issued, and a portion adapted to bear the second signature of the patron designating the withdrawal of the amount named upon the body of the check from the patron's account in the banking institution issuing the check.

The invention further aims at the provision of a check so constructed as to eliminate fully one-half of the clerical work heretofore necessary in the handling of savings and checking accounts; wherein it is only necessary to fill out certain hereinafter pointed out memorandum upon the stub of the check to obtain a complete record of the same; wherein the check may be used as a negotiable or a non-negotiable instrument; wherein the check is so constructed that it may revert to and become a part of the permanent record of the issuing institution and any irregularities subsequently developing may be readily verified; to provide a check which may be issued for various denominations and having means for protecting the institution and the purchaser without the necessity of providing separate checks for separate amounts; and to provide a check which is of simple construction and may be readily handled by employees of the institution and by patrons without the necessity of special or skilled knowledge in the handling of the instrument.

The above, and various other objects and advantages of this invention will be in part described in, and in part become apparent from, the following detailed description of the present preferred embodiment, the same being illustrated in the accompanying drawings, wherein:

Figure 1 is a face view of a check constructed according to the present invention.

Fig. 2 is a detail enlarged face view of the stub portion of the check having a part of the protecting portion thereon detached from the body thereof.

Fig. 3 is a face view, enlarged, of the detached body of the check with the remaining part of the protecting portion thereon.

Fig. 4 is a detail enlarged rear face view of the body portion of the check.

Referring to the drawings by numerals, the check comprises a body portion 10, a protecting portion 11 detachably connected to the body portion 10 at one end thereof, and a stub portion 12 which is detachably connected to the protecting portion 11, the sections 10, 11 and 12 forming the complete check and adapted to be separated only upon issuance of the body portion 10.

The stub portion 12 of the check may be designated as the inner portion thereof and is provided, at preferably its free marginal end, with perforations 13 or other suitable means facilitating the mounting of the stub 12 in a binder or the like. This stub 12 is provided upon its front face with an interest memorandum space 14 in which is placed, preferably in one or more rows, blank spaces suitably arranged for entering amount of interest due at certain times and the date when the interest is computed. The stub 12 is also provided with a cashier's memorandum space or blank 15 in which is adapted to be entered the necessary data for carrying on the account and which preferably contains spaces for the date when the body of the check is sold; the amount for which the body of the check is issued; the name of the purchaser; the date when the amount is paid; the principal; the interest; the total; the name of the teller or other attendant at the banking institution issuing the check body; and a blank space for making note of any remarks necessary in connection with the transaction. The other side of the stub 12 is preferably blank and may be used for making any additional notes, items, or the like which is found necessary in the handling of the account.

The check body 10 may be of the dimensions of ordinary checks, and at its inner end, or the end adjacent the stub 12, carries the desired portion of the protecting section 11, the latter being divided by transverse lines or scores 16 into relatively small transverse sections each of which bears the legend "not payable for more than," and the amount for which the check body may be issued. The amounts in these spaces between the lines 16 may be consecutively made to indicate from one dollar to any desired amount, in the present illustration the transverse sections being indicated for amounts ranging from twenty-five to one thousand dollars. The body section 10 is adapted to be separated from the stub section 12 upon the necessary lines 16 so as to leave attached to the check body 10 the section noting the highest amount for which the check body is issued. The remainder of the protecting portion 11 may be retained with the stub 12 to serve as a check upon that portion of the protecting section 11 which accompanies the body 10.

The body 10 is provided with a space 17 in which may be placed the consecutive, or serial number, or both numbers; the space 17 being preferably arranged at the upper right hand corner of the check body 10. At the upper left hand corner of the check body is provided a space 18 accompanied by suitable legends and adapted to contain the signature of the purchaser at the time the check is issued to the patron. By the provision of this space 18 for the signature of the purchaser or patron, it is unnecessary for the banking institution to maintain a card system of signatures of their patrons, thus eliminating one of the most troublesome and time consuming features in the conduct of the banking establishment. The check body 10 also contains a space 19, identified by suitable legends, in which is adapted to be written the amount for which the check 10 is made out by the patron or purchaser, the amount being any sum within the full amount for which the body 10 has been issued.

A blank 20 is provided at the lower left-hand corner of the body 10 within which is adapted to be written the signature of the original purchaser or patron, the signature in the space 20 being compared with the signature in the space 18 and serving as a check in ascertaining the lawful signature to the check body for use not only by the banking institution, but also by the party accepting the check body filled out as an order or payment.

The check body 10 is further provided, at preferably its lower intermediate portion, with a space 21 wherein may be entered the date of payment of the sum named upon the face of the check body, the principal paid, the interest on the amount of principal paid, and the sum total of the transfer or transaction. The lower right hand corner portion of the body 10 is also provided with a blank space 22 adapted to contain the signature of the treasurer or cashier of the banking institution issuing the check.

It is thus observed that a check body 10 thus constructed and having its face arranged as above described, provides a means for insuring a check for any amount up to the highest amount indicated upon the marginal edge of the check as indicated by the remaining portions or sections of the protecting part 11. This check body 10 also provides a means upon the face of the check for identifying the signature of the original purchaser or patron so that on presentation of the check the two signatures may be compared and the payee may readily determine the authenticity of the second signature in the space 20.

Upon the rear face of the check body 10 is inscribed the conditions under which the patron or purchaser accepts the check from the banking corporation and the conditions governing the transaction of handling the check, whether negotiable or non-negotiable. If the check is negotiable, the rear face of the check, as shown in Fig. 4, is provided with one or more blank spaces 23 for endorsements, followed by the conditions of sale and purchase, the conditions being preferably set forth as shown in Fig. 4 in consecutively numbered paragraphs.

For the purpose of illustrating one, and preferably the preferred use of the present check, the back of the check body 10 may contain in paragraph one a statement as to the rate of interest which the check is adapted to bear and a statement defining the time from which said rate of interest is adapted to run. The second paragraph of conditions may also relate to the conditions under which the interest may be allowed or other conditions effecting the payment of the interest, such as no interest to be allowed if the check be cashed within less than a prescribed time. The third paragraph sets forth that the original purchaser must sign his name in the space 18 in the presence of an officer or employee of the bank, and must also counter-sign a comparative signature in the space 20 when transferring the check. Various other conditions for the protection of the banking institution and the patron may also be imprinted upon the back of the check body 10 in the various paragraphs, such as will be apparent from a reading of Fig. 4. For the purpose of encouraging thrift and savings, the conditions may include a paragraph such as designated as paragraph ten on the back of the check body 10, stating that the check cannot be used as current medium of exchange and if cashed within less than a prescribed time certain rates of exchange may be deducted from the face value at the discretion of the bank, the legends being followed by tabulations of certain prescribed rates, such as a deduction of three cents upon the demand of payment of a sum of two dollars and fifty cents for which the check body 10 is filled in; a deduction of fifteen cents for amount not over forty dollars for which the check may be filled in. This thus gives a notice to the purchaser and any payee accepting the check for the various sums within certain prescribed time. The check bearing these conditions, and constructed as above described, provides a means for encouraging thrift and savings when used either as a non-negotiable or a negotiable instrument.

When the check 10 has been issued, for a certain amount which is noted by the banking institution upon the stub 12 and which is indicated by the line of severance of the protecting section 11, the check body 10 may be made out for any sum within the limit indicated. When the check 10 is returned to the bank or other institution, the face value of the check body 10 is entered up upon the corresponding stub 12, which is numbered according to the check body 10, as found in the space 17, so that it is unnecessary to employ separate account sheets for the various patrons and the checks issued.

I claim:

A convertible interest bearing savings check comprising a single sheet divided transversely on one side by separately designated severance indication lines into a stub portion and a body portion, said stub portion having a binding part segregated by a line of perforations whereby the stub may be removed from a binder subsequent to the closing of the account, said stub portion having on one face a plurality of blocks defined by marginal lines for the reception of various data relative to check and interest handling, said body portion being divided on its face by lines into a block for the serial number of the check, a second block designated for the signature of the purchaser at the time of purchase from the bank, another block in which is adapted to be written the amount for which the check may be subsequently issued by the purchaser, and another block for the second signature of the purchaser for comparison with the signature in said second block, said body portion also being divided by lines on its face into a space for the date of payment of the sum named on the face of the check, another space for the amount of interest paid, a further space for the sum total of the transaction, and constructed with a still further space for the signature of an officer of the bank issuing the check, and means on the reverse side of said body portion for governing entries therein to control the withdrawals from the savings account.

GEORGE H. BANKS.